April 26, 1949.    R. D. MAYSTEAD    2,468,635
APPARATUS FOR TESTING HYDRAULIC AND
ELECTRIC PROPELLER GOVERNOR
Filed Nov. 14, 1944    7 Sheets-Sheet 1

INVENTOR
RICHARD D. MAYSTEAD
BY
HARRIS, KIECH, FOSTER & HARRIS

FOR THE FIRM
ATTORNEYS

April 26, 1949.　　　R. D. MAYSTEAD　　　2,468,635
APPARATUS FOR TESTING HYDRAULIC AND
ELECTRIC PROPELLER GOVERNOR
Filed Nov. 14, 1944　　　7 Sheets-Sheet 2
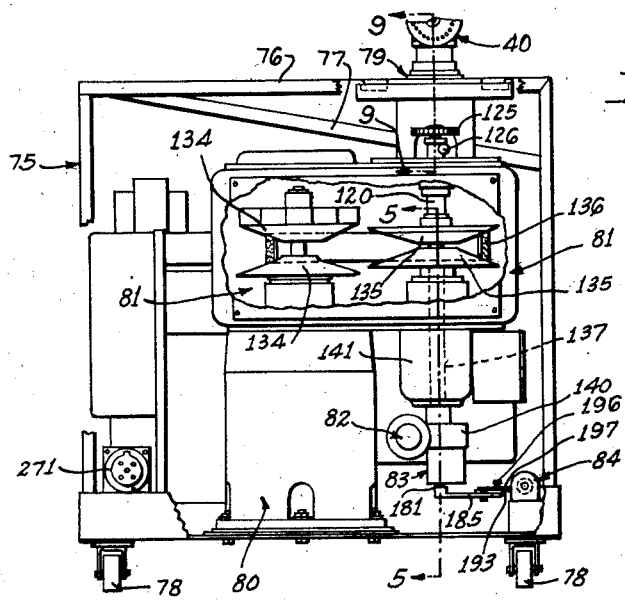
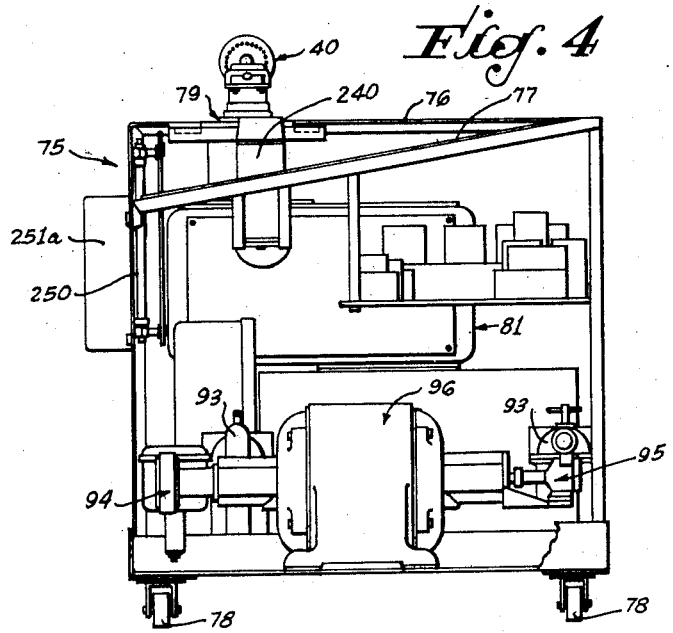
INVENTOR
RICHARD D. MAYSTEAD
BY
HARRIS, KIECH, FOSTER & HARRIS
FOR THE FIRM
ATTORNEYS April 26, 1949.   R. D. MAYSTEAD   2,468,635
APPARATUS FOR TESTING HYDRAULIC AND
ELECTRIC PROPELLER GOVERNOR
Filed Nov. 14, 1944   7 Sheets-Sheet 3
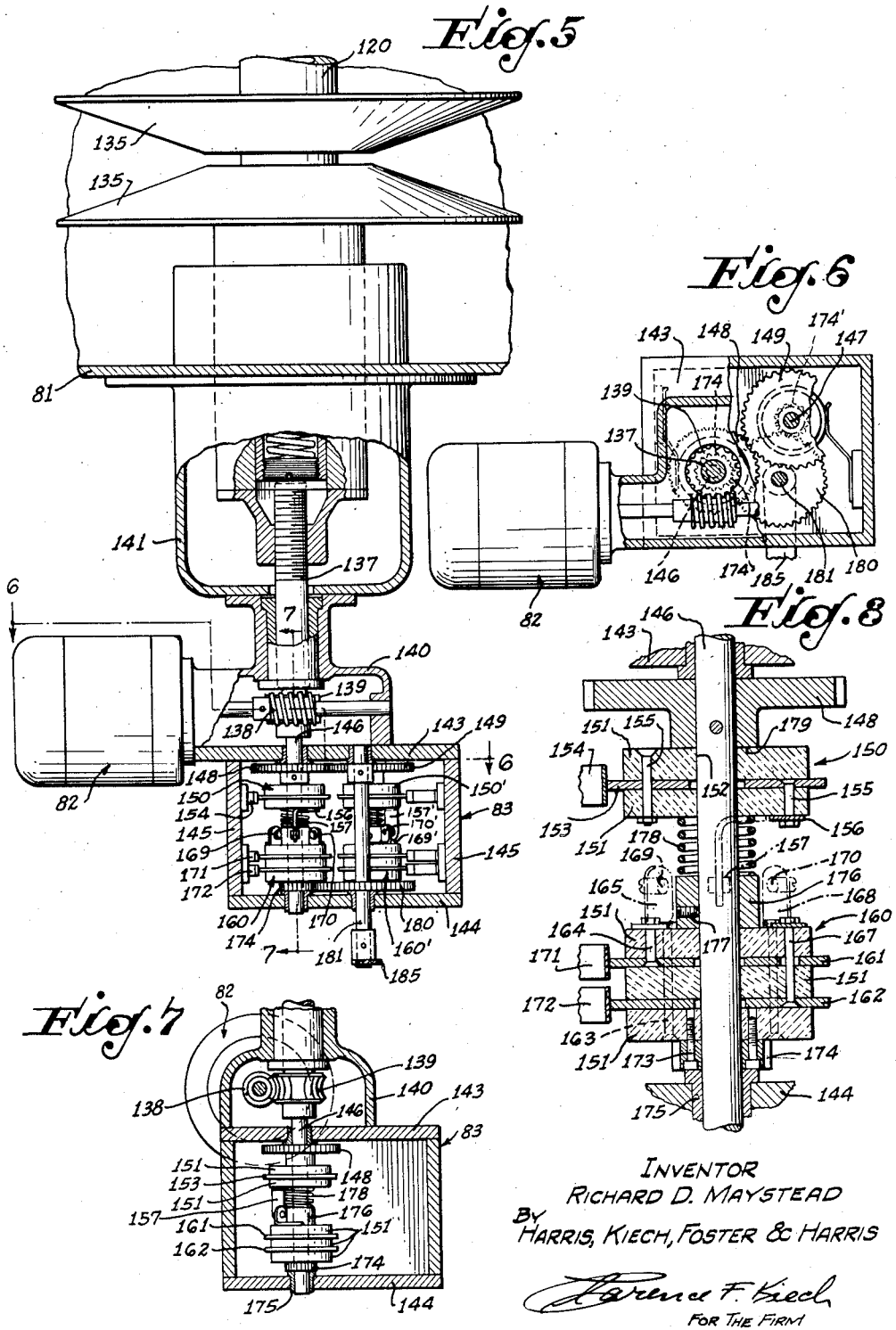
INVENTOR
RICHARD D. MAYSTEAD
BY HARRIS, KIECH, FOSTER & HARRIS
Lawrence F. Kiech
FOR THE FIRM
ATTORNEYS

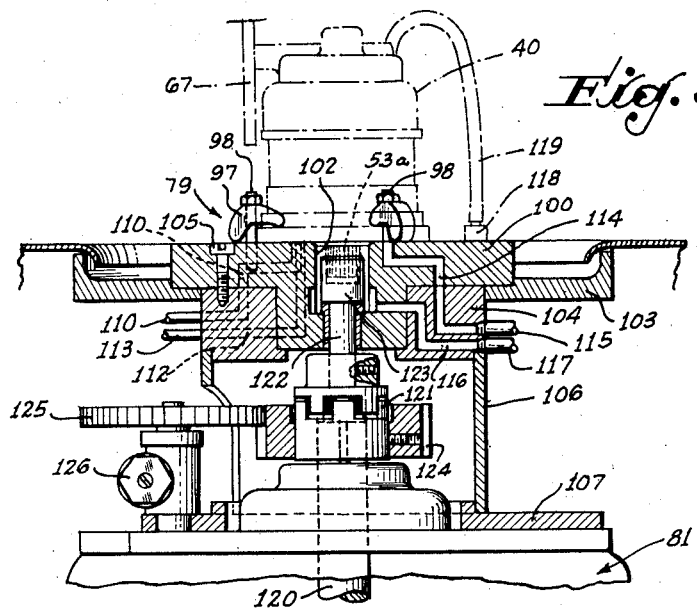
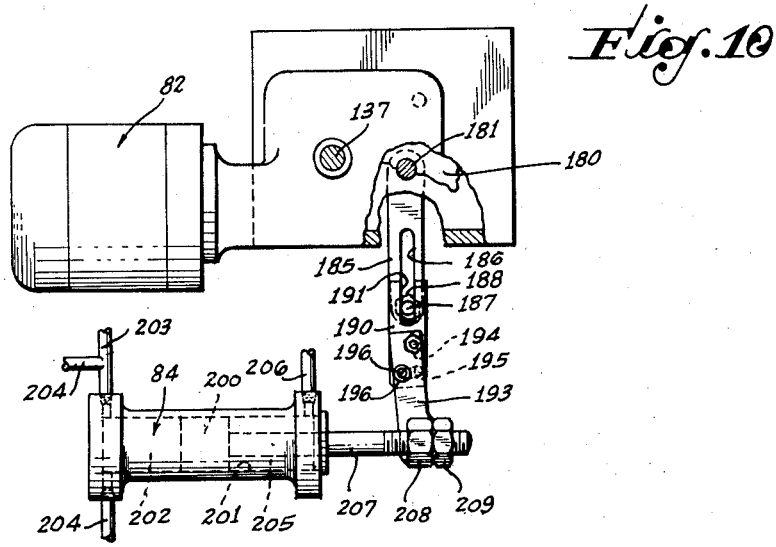

April 26, 1949.  R. D. MAYSTEAD  2,468,635
APPARATUS FOR TESTING HYDRAULIC AND
ELECTRIC PROPELLER GOVERNOR
Filed Nov. 14, 1944  7 Sheets-Sheet 5

*Fig. 11*

INVENTOR
RICHARD D. MAYSTEAD
By
HARRIS, KIECH, FOSTER & HARRIS

*Clarence F. Kiech*
FOR THE FIRM
ATTORNEYS

Fig. 12

April 26, 1949.
R. D. MAYSTEAD
2,468,635
APPARATUS FOR TESTING HYDRAULIC AND
ELECTRIC PROPELLER GOVERNOR
Filed Nov. 14, 1944
7 Sheets-Sheet 7
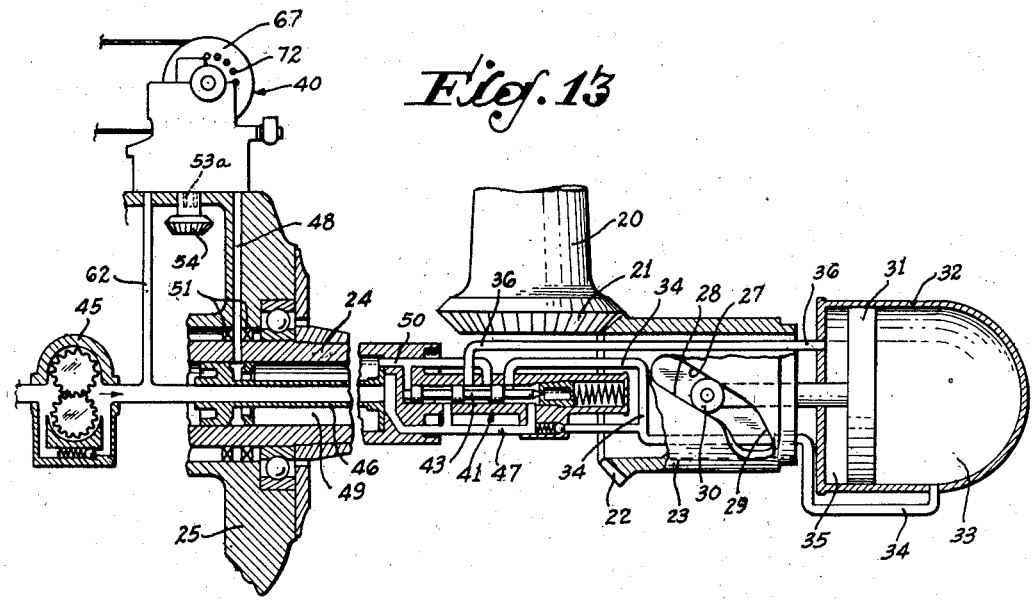
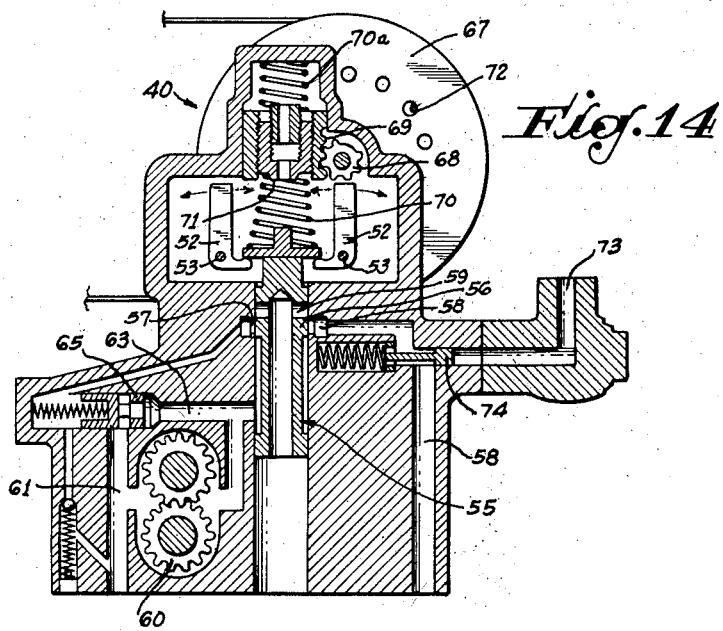
INVENTOR
RICHARD D. MAYSTEAD
BY
HARRIS, KIECH, FOSTER & HARRIS
FOR THE FIRM
ATTORNEYS Patented Apr. 26, 1949

2,468,635

UNITED STATES PATENT OFFICE 2,468,635

APPARATUS FOR TESTING HYDRAULIC AND ELECTRIC PROPELLER GOVERNORS

Richard D. Maystead, North Hollywood, Calif., assignor to Pacific Airmotive Corporation, a corporation of California Application November 14, 1944, Serial No. 563,346

13 Claims. (Cl. 73—1)

My invention relates to testing apparatus and, more particularly, to a novel apparatus for testing propeller governors, both electric and hydraulic, such as are used in the automatic control of pitch of the blades of an airplane propeller.

Propeller governors can be classified under two general types, namely, hydraulic and electric. The hydraulic-type governor is driven by the airplane engine and includes flyweights which actuate a pilot valve controlling the flow of engine oil to and from the hydraulic system of a propeller, which hydraulic system conventionally employs a double-acting piston movable along the axis of rotation of the propeller in response to differences in pressure on the inboard and outboard sides thereof, this piston being operatively connected to each of the blades of the propeller for simultaneous change in pitch upon movement of the piston. The hydraulic-type governor includes a governor booster pump equipped with a suitable relief valve, and the pilot valve actuated by the flyweights serves to control the flow of the governor-pressured oil to the hydraulic system of the propeller and, in some instances, the drainage of oil from the propeller. The oil lines leading from the governor to the propeller pass through the rotating shaft on which the propeller is mounted, thus requiring sealing at the point of entry into or from the shaft by use of suitable so-called transfer rings which give rise to some leakage. In addition, provision is often made for feathering and unfeathering the propeller blades, often by delivering oil at substantially higher pressure, derived from a separate pump and supplied to the governor through a governor transfer valve and a distributor valve associated with the shaft of the propeller to control the flow of highly-pressured oil in a manner to feather and unfeather the blades.

All propeller governors, whether hydraulic or electric, serve the purpose of changing the pitch of the blades of the propeller in such way as to maintain the speed of the propeller substantially at a predetermined value, irrespective of changes in engine output. In addition, most governors provide means for changing the speed at which the propeller is governed, for example changing the setting of a spring resisting outward movement of the governor flyweights by centrifugal force. In hydraulic-type governors, the setting of this spring adjustment is controlled either by mechanical means or by the so-called electric head. In either instance, the speed at which the system is governed is under the control of the pilot or flight engineer. Stated generally, the pilot sets this adjustment for the desired engine speed. If the governor is maintaining engine speed at this value, the condition is said to be "on-speed." If the speed of the engine is higher or lower than that called for by the governor, the condition is said to be "overspeed" or "underspeed," respectively.

Hydraulic-type propeller governors now in use are in four differently-operating types. The first class is known as the "controllable" governor. When in underspeed condition, high-pressure oil enters the propeller line to decrease the pitch, while an overspeed condition permits oil to drain from the propeller line to increase the pitch. In an onspeed condition, the pilot valve closes the propeller line to entrap the oil therein and maintain the pitch. A second widely used type is known as the "Hydromatic" governor, which may be of the "single-capacity" or "double-capacity" type, the latter being very widely used on commercial and military aircraft. In the "Hydromatic" governor, an underspeed condition permits oil to drain from the propeller to decrease the pitch; an overspeed condition permits high-pressure oil to enter the propeller to increase the pitch; and an onspeed condition permits the pilot valve to close the propeller lines to maintain the pitch. The "Hydromatic" governor is feathered by oil delivered from an auxiliary source to the propeller. The third type is known as the "accumulator-type" governor and differs from the "Hydromatic" governor primarily in employing an accumulator which, during normal propeller operation, becomes charged with pressured oil, stored oil being forced to the propeller system during periods when other oil is not available. The fourth relatively new type is known as the "double-acting" governor. When in underspeed condition, the inboard side of the propeller piston drains and high-pressure oil is supplied to the outboard side, thus decreasing the pitch. In an overspeed condition, the outboard side of the propeller piston drains while high-pressure oil is supplied to the inboard side to increase the pitch. In an onspeed condition, the governor pilot valve closes the propeller lines to maintain the pitch. Feathering is obtained by supplying oil from an auxiliary source to the propeller.

On the other hand, electric-type propellers provide a reversible electric motor associated with the propeller for changing the pitch of the blades. The direction and degree of forward or rearward motion is controlled by a single-pole, double-throw switch in the propeller governor which in turn is actuated by movement of the governor flyweights. Certain auxiliary mechanism and electrical connections are also provided.

It is an object of the present invention to provide a testing apparatus for various types of propeller governors. From the above, it will be apparent that the various governors operate differently and require somewhat different test procedures. Heretofore there has been no universally applicable testing apparatus, and the hydraulic, electrical, and variable-speed drive arrangement of the present invention are believed to be fundamentally new.

A proper testing of any propeller governor makes desirable the simulation of conditions during actual use, e. g., in flight, and it is an object of the present invention to provide a testing apparatus which will simulate governor performance in such use and which will, for example, maintain and control pressures, temperatures, and viscosity of the oil to be similar to those encountered during actual use of the governor.

It is another object of the invention to provide a testing apparatus having elements substantially duplicating the action of engine, propeller, and affiliated parts, and in which the propeller governor itself can be made to control such elements. Many difficulties are encountered in this connection as it is impractical to conduct governor tests during flight or while the governor is actually connected to and driven by the engine. Further, it is impractical to attach the governor to a test engine and propeller as, even then, actual flight conditions cannot be duplicated.

In the present invention, a variable-speed drive is employed to simulate the engine. It is an object of the present invention to operate this drive under the control of the propeller undergoing test. In testing a hydraulic governor, this makes desirable employment of a hydraulic actuator simulating the action of the hydraulic system of the propeller, and the invention includes among its objects the use of such an actuator hydraulically associated with the governor under test and the operative connection of the actuator to vary the speed of the drive unit. For example, the hydraulic actuator may comprise a hydraulic cylinder controlled by the governor output and, in turn, controlling the speed of an electric drive unit, to the end that underspeed, onspeed, and overspeed conditions can be simulated.

Another object of the invention is to provide a governor testing apparatus including a substantially-constant-speed electric motor connected to drive the governor through a variable-speed transmission, the speed being determined by the movement of a control member, and to operatively connect this control member with the governor under test. Movement of the control member is preferably by use of a reversible pilot motor. In testing an electric governor, the circuits of the pilot motor can be energized through relays controlled by the electrical contacts in the governor itself. In testing hydraulic governors, a hydraulic control means controlled by governor output can be used, together with means for translating movement of the hydraulic control means into electric variations which actuate the pilot motor. In the preferred embodiment, this hydraulic control means includes the hydraulic actuator and an automatic control unit. It is an object of the invention to provide such systems; to provide a novel hydraulic control means; to provide a novel automatic control unit for translating movements of a hydraulic actuator into electric variations; and to provide the entire system with means to accommodate the different types of governors being tested.

Other objects of the invention lie in the provision of a novel test stand for the testing of propeller governors; a novel electrical system for energizing the governor or its accessories undergoing test and for indicating overspeed, underspeed, and onspeed conditions; a novel hydraulic system for testing any one of a number of different types of governors; novel means for controlling the temperature of the oil used for test purposes in its flow through a closed system incorporated in the test stand; and to provide a novel arrangement of electrical and hydraulic meters for indicating flow rates and pressures. Further, the invention has among its objects the provision of a self-contained test stand which can be connected to existing electrical outlets and, if desired, to existing water lines for testing one or a number of different types of propeller governors.

Other objects and advantages of the invention will be evident to those skilled in the art from the following exemplary description of an embodiment which has been found to be particularly useful in the universal testing of propeller governors.

Referring to the drawings:

Figure 3 is a sectional view at one end of the test stand, taken substantially along the line 3—3 of Figure 1;

Figure 4 is a sectional view at the other end of the test stand, taken substantially along the line 4—4 of Figure 1;

Figure 5 is a vertical sectional view through the automatic control means of the invention, taken substantially as indicated by the line 5—5 of Figure 3;

Figure 6 is a sectional view, taken along the broken line 6—6 of Figure 5;

Figure 7 is a vertical sectional view, taken along the line 7—7 of Figure 5, showing one set of control elements in elevation;

Figure 8 is an enlarged fragmentary view, taken similar to Figure 7 but showing the set of control elements in section;

Figure 9 is a vertical sectional view of the governor mounting pad and the drive connection for the governor, taken substantially along the line 9—9 of Figure 3;

Figure 10 is a view similar to Figure 6, showing the connection between the automatic control unit and the hydraulic actuator;

Figure 11 is a pipeline diagram illustrating the hydraulic system;

Figure 12 is a wiring diagram of the test stand;

Figure 13 is a view diagrammatically illustrating the elements employed in a typical hydraulically operated system for controlling the pitch of a propeller; and Figure 14 is a view diagrammatically illustrating the hydraulically operated propeller governor shown in Figure 13, in this instance a "Hydromatic" double-capacity governor, in an onspeed condition.

*Typical hydraulic governor and operation*

Figure 1:
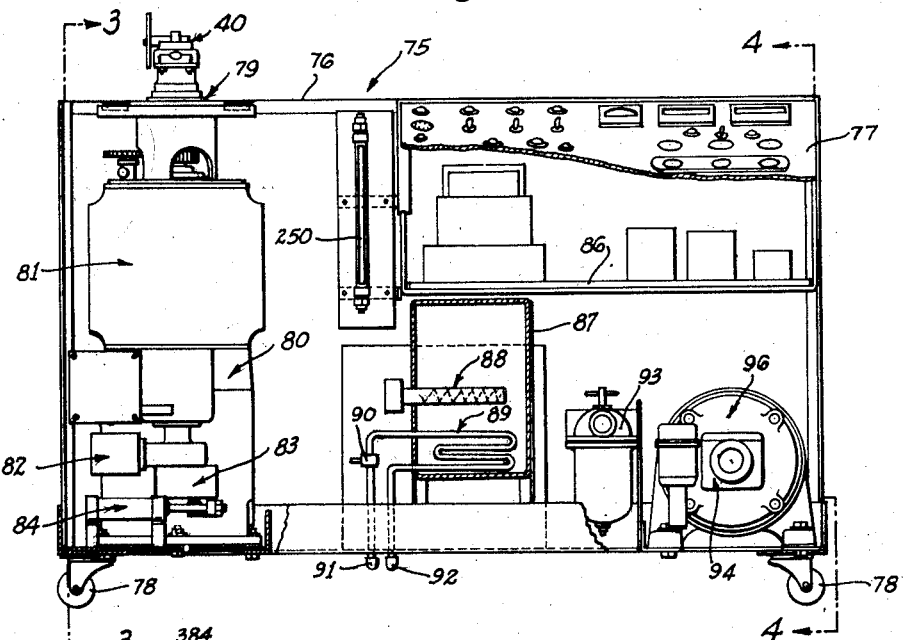
Figure 1 is a front view of the test stand with the front wall and a portion of the control panel broken away.

A complete understanding of the invention requires knowledge of the operation of the various governors to be tested. As exemplary, Figures 13 and 14 show a typical widely-used hydraulic governor, namely, the "Hydromatic" double-capacity governor and its hydraulic and mechanical environment, the governor setting in this instance being manual. It will be understood that these views are merely diagrammatic and are presented merely as an aid in understanding the test operations to be later described.

In Figure 13, one of several propeller blades is indicated by the numeral 20. Each blade has a crown gear 21 meshing with a gear 22 of a cam 23 disposed in the forward part of the propeller and rotatable about the axis of an engine-driven shaft 24, the engine housing being indicated at 25. The cam 23 provides one or more cam slots 27, one of these being shown as including an operating portion 28 and a feathering portion 29. In each cam slot is a roller 30 which is moved forwardly and rearwardly by a piston 31 sliding in a domed cylinder 32. The outboard side of the piston 31 bounds an outboard chamber 33 and oil can flow to and from this chamber through a pipe 34. Similarly, the inboard side of the piston 31 bounds an inboard chamber 35 to and from which oil may flow through a pipe 36 under the control of the propeller governor indicated generally by the numeral 40.

Within the propeller shaft is a propeller distributor valve, indicated generally by the numeral 41, which need not be described in detail as it is well known in the art. Suffice it to say that this distributor valve includes a hydraulically actuated valve member 43 sliding in a ported cylinder and normally in the position suggested in Figure 13 to supply oil from a main engine pump 45 through pipe 46 and passage 47 to the pipe 34, whereby the outboard chamber 33 tends to receive oil at a pressure determined by the engine pump 45, this oil pressure tending to move the piston 31 inwardly to decrease the pitch of the propeller blades. The blades themselves have centrifugal moments (tending normally to turn the blade toward low pitch) exceeding their aerodynamic moments (tending to move the blade toward high pitch), the net moment aiding engine-pressured oil in the outboard chamber 33 in moving the blades toward low pitch position. To move the blades toward high pitch position, engine oil at augmented pressure is delivered by the governor 40 to passageway 48, annular space 49, and passage 50, the distributor valve positioned as shown transferring this governor-pressured oil through the pipe 36 to the inboard chamber 35. This pressured oil is transferred from the passageway 48 to the annular space 49 by use of transfer rings 51.

The governor 40 is illustrated in Figure 14 with flyweights 52 in onspeed condition. These flyweights are pivoted at 53 to a structure, not shown because of the diagrammatic nature of Figure 14, which is driven by the engine through splined connection 53a engaging a bevel gear 54, Figure 13. The position of the flyweights 52 determines the vertical position of a pilot valve 55, shown in onspeed position and having a land 56 closing off passages 57 and 58 in this position but providing a passageway 59 immediately above the land 56.

A governor oil pump 60 intakes from a passage 61 communicating through a pipe 62 with the main engine pump 45. High-pressure oil from the governor pump 60 is delivered to a passage 63, and a spring-loaded pressure relief valve 65 controls the maximum pressure in the passage 63 by moving leftward to bypass oil from the passage 63 to the passage 61. The passage 57 communicates with the rear of the pressure relief valve 65, as shown.

When the governor is operating in an overspeed condition, the flyweights 52 move outward as indicated by the full-line arrows to raise the pilot valve 55, thus delivering pressured oil from the passage 63 to the passage 58 and thence through passageway 48 and the distributor valve 41 to the inboard chamber 35 to move the piston 31 outward in a manner to increase the pitch. Oil from the outboard chamber 33 drains through the distributor valve 41 and returns to the discharge of the main engine pump 45 through the pipe 46.

When the governor is operating in an underspeed condition, the flyweights 52 move inward as indicated by the dotted arrows, thus lowering the pilot valve 55. The inboard chamber 35 then drains to the engine housing through the distributor valve 41, passageway 48, passage 58, and through the interior vertical passage of the pilot valve 55. In the onspeed condition illustrated in Figure 14, the land 56 of the pilot valve locks the liquid in the hydraulic passages leading to the chamber 35.

The speed setting of the governor is adjusted by turning a pulley 67 to turn a pinion 68 meshing with a rack assembly 69, and thus changing the tension of a speeder spring 70 urging the pilot valve 55 resiliently downward, aided by a counterbalance spring 70a. The low speed setting of the governor is adjusted by changing the vertical position of a stop 71 associated with the rack assembly 69, while the high speed setting of the governor is changed by varying the adjustment of a screw bearing against a pin set in one of a plurality of openings 72 of the pulley 67, this type of adjusting means being commonly known and therefore not herein shown or described in detail.

In feathering the propeller, high-pressure oil from an auxiliary pump is delivered through a flexible hose to a high-pressure port 73. The pressure is several hundred pounds per square inch and substantially higher than the pressure output of the pump 60 so as to displace a spring-loaded high-pressure valve 74 leftward to close off the upper portion of the passage 58 and open the lower portion to the high-pressure oil. The hydraulic pressure is insufficient to actuate the distributor valve 41 but enters the inboard chamber 35 to displace the cam roller 30 into the feathering portion 29 of the cam slot 27 to move the blades into feathered position. To unfeather the propeller, a pressure even higher than that used for feathering is supplied to the high-pressure port 73—a pressure sufficiently high to actuate the distributor valve in such way as to connect the high-pressure fluid to the outboard chamber 33 and to connect the inboard chamber 35 to the discharge of the main engine pump 45. The high-pressure fluid from the auxiliary source is usually under the control of a pressure cutout switch mounted on the governor, but not shown.

*General arrangement of invention*

Generally speaking, the invention includes a test stand 75, best shown in Figures 1, 3, and 4, approximately one-half of the top forming a deck 76 and the balance providing a sloping panel 77, suitable internal framework being provided and the test stand being provided with casters 78. Governor mounting means 79 extends to or through the deck 76 to mount the governor 40 undergoing test.

A variable-speed drive means is provided, including an electric motor 80 and a variable-speed transmission 81 controlled by a pilot motor 82 which, in turn, is actuated forwardly or rearwardly by an automatic control unit 83, best shown in Figures 3 and 5 to 8. A hydraulic actuator 84, connected hydraulically with the governor 40 and controlled thereby, is operatively connected to the automatic control unit 83, and is shown in Figures 1, 3, and 10.

As best shown in Figure 1, the interior of the cabinet of the test stand is provided with a shelf 86 on which is positioned some of the electrical equipment. Below this shelf is an oil reservoir 87 provided with an electric heating unit 88 and a cooling unit 89, preferably a pipe coil submerged in the oil and equipped with a solenoid-operated valve 90 controlling the flow of cooling water from a connection 91 through the coil and to waste through a connection 92. The heating unit 88 and the cooling unit 89 are controlled in a manner to be hereinafter described so as to maintain the temperature of the oil between narrow limits.

Oil from the reservoir 87 moves through two filters 93 and, respectively, to a low-pressure pump 94 and a high-pressure pump 95 (Figure 4) simultaneously driven by an electric motor 96. From here, the oil is delivered through pipes, valves, meters, etc., to the governor and, in some instances, from the governor to the hydraulic actuator 84, the oil being returned to the reservoir 87 for temperature adjustment and for re-use.

The general arrangement is such that the control panel 77, with its various valves, gauges, push buttons, and operating controls, is within easy reach and in full view of the operator. The governor under test may be operated with the left hand, while leaving the right hand free to operate the controls on the instrument panel. The interrelation of the various generally described elements and the function of the various controls and indicating means on the sloping panel 77 will be made evident hereinafter.

*Governor mounting and drive means*

The governor mounting means 79 is best shown in Figure 9 as including a plurality of slotted clamps 97 engaged by nuts threaded to slot-traversing studs 98 spaced peripherally around the base of the governor and engaging a lower flange thereof. This type of clamping means permits quick attachment and detachment of the governor to a governor mounting pad 100. To aid in proper location of the governor, a plurality of dowels extend upward from the pad into correspondingly-spaced openings of the governor. The pad 100 provides a chamber 102 for receiving the splined connection 53a of the governor. Surrounding the pad 100 is a suitable sump member 103 to receive any oil leakage incidental to the attachment or detachment of the governor. A mounting ring 104 is connected below the pad 100 by countersunk screws 105, and a tubular member 106 is welded to the ring 104 and to a plate 107 secured to the upper end of the variable-speed transmission 81.

The pad 100 and the ring 104 provide several pad passages registering with the fluid passages of various hydraulic governors, these pad passages being shown both in Figure 9 and in Figure 11. They include a governor-pump intake passage 110 fed by a low-pressure line 111 which, with the "Hydromatic" governor previously described, corresponds to the pipe 62; an inboard output passage 112 communicating with a pipe 113; and an outboard output passage 114, used only when testing the "double-acting" type of governor and communicating with a pipe 115. In addition, the chamber 102 receives the discharge and leakage from the governor and communicates through a passage 116 with a pipe 117. The pad 100 also provides a connection 118 for receiving a rubber hose 119 connected to the high-pressure or feathering port of the governor, e. g., the port 73 previously mentioned.

The variable-speed transmission 81 provides an upwardly-extending output shaft 120 connected by a flexible coupling 121 to a stub shaft 122 carrying a drive connection 123 meshing with the splined connection 53a. Surrounding the coupling 121 is a gear 124 meshing with a gear 125 to drive a tachometer connection 126 which extends to a tachometer 127 mounted on the control panel (see Figure 2) and to a revolution counter 128, also mounted on the control panel. The tachometer 127, the counter 128, and a timer 129 are a part of a standard chrono-tachometer operating substantially as follows. The tachometer 127 gives a reading of the instantaneous speed of the drive connection 123 at any time. The counter 128 records the total number of revolutions from the time that start button 130 is depressed, this counter being resettable to zero by a counter reset knob 131. Pressing of the button 130 also starts the timer 129 and both can be simultaneously stopped by releasing the start button 130 to give integrated readings of total revolutions and time which, if divided, gives a more accurate indication of speed than does the tachometer 127. The timer 129 provides a timer reset 132 for returning the timer to zero. This chrono-tachometer system provides also for the automatic stopping of the timer 129 after the lapse of a predetermined period of time. Thus, a toggle switch 133 may be thrown to "automatic" position to accomplish this result. This chrono-tachometer is not, per se, a part of the present invention and its operation will be understood by those skilled in the art.

While various means may be employed for changing the speed of the governor drive connection 53a, the variable-speed transmission 81, driven by the substantially constant-speed motor 80, has been found excellently suited to this purpose and very rugged and dependable in operation. The variable-speed transmission 81 may be of the V-belt type, including separable cones 134 driven by the motor 80 and separable cones 135 driving the output shaft 120, the two pairs of cones being connected by a V-belt 136. A control member in the form of a control shaft 137 serves, when rotated in one direction, to increase the speed and, in the other direction, to decrease the speed of the output shaft 120 by relatedly changing the effective diameters of the pulleys formed by the cones 134 and 135. Such variable-speed transmissions, with a suitable hand wheel connected to the control shaft 137, are well known and need not be further described. They are readily adapted to the invention by removing the hand wheel and rotating the control shaft 137 forwardly and rearwardly by use of the pilot motor 82, which is of the reversible type. The connection between the pilot motor 82 and the control shaft 137 is best shown in Figures 5, 6, and 7 and should preferably be a gear reduction drive. For example, the pilot motor 82 may carry a worm 138 meshing with a worm gear 139 secured to the control shaft 137, this gearing being mounted in a gear box 140 depending from a sub-housing 141 of the variable-speed transmission 81. While the pilot motor 82 may be of any suitable reversible type, the connections hereinafter described employ a small three-phase reversible motor in this connection. A gear reduction in the neighborhood of 100:1 will usually be found satisfactory but will vary with the variable-speed transmission 81 employed.

*Automatic control means*

The automatic control means, comprising the automatic control unit 83 and the hydraulic actuator 84, serves the function of increasing and decreasing the speed of the governor in response, respectively to underspeed and overspeed conditions in the governor. In effect, the automatic control unit 83 and the hydraulic actuator 84 simulate the operation of a hydraulically-controlled propeller, while the motor 80 and variable-speed transmission 81 simulate the airplane engine. Thus, the hydraulic actuator receives oil under the control of the governor and, in turn, controls the automatic control unit 83 to control the direction and time of rotation of the pilot motor 82 in such manner as to adjust the speed of the drive connection 53a to bring the governor to an onspeed condition.

The automatic control unit 83 includes a top wall 143, a bottom wall 144, and a plurality of side walls 145. A shaft 146 is connected to the worm gear 139 to rotate with the control shaft 137. This shaft 146 is journalled in bearings in the upper and lower walls 143 and 144, as is also a similar shaft 147 (Figure 6). These shafts are interconnected by gears 148 and 149 to turn in opposite directions with the same degree of angular movement as the control shaft 137, the gears being respectively attached to the shafts. In effect, the shaft 146 and its associated equipment control the pilot motor 82 when testing one type of hydraulic governor, e. g., the "Hydromatic" type, while the shaft 147 and its associated equipment control the pilot motor 82 when testing another type of hydraulic governor, e. g., the "controllable" governor. As previously mentioned, the hydraulic relationships of these two governors are opposed, and compensation for this is provided by the opposite rotation of the shafts 146 and 147. As the equipment associated with each of these shafts is identical in construction, detailed description of one will suffice. Figure 8 best indicates the equipment associated with the shaft 146 and corresponding equipment associated with the shaft 147 will be indicated by primed, but otherwise corresponding, numerals.

Referring particularly to Figures 5, 7, and 8, the shaft 146 is surrounded by two sets of control elements. The upper control element or drum is indicated generally by the numeral 150 and includes two disks 151 formed of insulating material, each providing a central opening 152 of such size as to journal freely on the shaft 146. A contact ring 153 is clamped between the disks 151 and provides a central opening larger than the shaft 146 to avoid electrical contact therewith. The periphery of the contact ring 153 is engaged by a brush contact 154 mounted on, but insulated from, the adjacent side wall 145. The disks 151 are clamped against the ring 153 by a plurality of bolts 155, at least one of which carries a contact member 156 extending downwardly to provide a contact means, hereinafter referred to as an intermediate contact 157.

The lower control element or drum is indicated by the numeral 160 and provides two contact rings 161 and 162 sandwiched between three of the disks 151 formed of insulating material, the structure being held together by bolts 163 passing through enlarged holes of the contact rings to be insulated therefrom. As before, the disks 151 are journalled freely on the shaft 146 and the contact rings 161 and 162 are spaced from the shaft periphery. A bolt 164 is electrically connected to the contact ring 161 and extends upwardly to retain a contact member 165 in position. Similarly, one or more bolts 167 are electrically connected to the contact ring 162 and pass upward through enlarged openings of the contact ring 161 to be insulated therefrom, the upper end of the bolt 167 supporting, and being electrically connected to, a contact member 168. The contact members 165 and 168 provide relatively rigid upturned portions carrying contact means hereinafter referred to as side contacts 169 and 170, or as "decrease" and "increase" contacts 169 and 170, respectively. These side contacts are disposed in the same horizontal plane as the intermediate contact 157 and are spaced apart a sufficient distance to accommodate the intermediate contact 157, while permitting at least several degrees of rotation before the intermediate contact, if centrally disposed, will electrically engage either of the side contacts 169 or 170. The peripheries of the contact rings 161 and 162 are engaged, respectively, by brush contacts 171 and 172 mounted on, but insulated from, the adjacent side wall 145. Correspondingly, current can be conducted from the brush contact 171 to the side contact 169 and from the brush contact 172 to the side contact 170.

Secured to the lowermost disk 151 by screws 173 is a pinion 174 which rests frictionally on a flange of a sleeve bearing 175 in the lower wall 144 and which journals the shaft 146. The pinion 174 journals freely on the shaft 146 but definitely controls the angular position of the lower drum 160 and the corresponding side contacts 169 and 170. Immediately above the uppermost disk 151 of the lower drum 160 is a collar 176 rigidly connected to the shaft 146, as by a set screw 177. The lower drum 160 is free to rotate on the shaft 146 between the flange of the bearing 175 and the collar 176. A helical spring 178 is compressed between the collar 176 and the lower disk 151 of the upper drum and serves the important function of urging this drum resiliently upward into frictional contact with a surface 179 of the gear 148.

The pinions 174 and 174' (the latter being associated with the shaft 147 and shown in Figure 6) are both meshed with a gear 180 secured to a third or oscillating shaft 181 journalled in bearings in the upper and lower walls 143 and 144. The shaft 181 oscillates in response to movement of the hydraulic actuator 84 to rotate the lower drums 160 and 160' in opposite directions, these drums freely journalling respectively on their shafts 146 and 147 during this opposed movement.

The interconnection between the oscillating shaft 181 and the hydraulic actuator 84 is best shown in Figures 3 and 10, particularly the latter. The preferred connection includes an arm 185 fixed to the lower end of the oscillating shaft 181 and providing a slot 186. A pivot pin 187 may be moved along this slot 186 and clamped at various positions therealong by means of a nut 188 to provide an adjustment varying the lever arm of the arm 185. Overlying the arm 185 is an attachment member 190 providing bifurcations extending on opposite sides of the pin 187 to leave a U-shaped slot 191 in which the pin extends and in which the pin may move slightly as the arm 185 swings. The attachment member 190 is adjustably connected to a bar 193 to permit angular adjustment therebetween about a bolt 194 traversing both the member and the bar. The attachment member 190 provides an arcuate slot 195. A bolt 196 is adjustably positioned in this slot and extends upward through an opening in the bar 193 to carry a spring 197 adjustably compressed against the top of the bar 193 by the bolt. This provides an adjustable frictional connection between the bar 193 and the attachment member 190.

The hydraulic actuator 84 comprises essentially a piston-cylinder arrangement simulating the arrangement in the forward end of the propeller, e. g., the elements 31, 32 of Figure 13. This cylinder-piston arrangement should be double-acting and may comprise two cylinders with interconnected pistons. However, the simplest embodiment includes a double-acting piston 200 movable in a cylinder 201 to define a low-pressure or outboard chamber 202 at one end of the piston communicating with pipes 203 and 204, and a high-pressure or inboard chamber 205 at the other end of the piston communicating with a pipe 206. A piston rod 207 connects the piston 200 with the bar 193. This is desirably accomplished by threading a nut 208 on this piston rod and held in place by a lock nut 209. The bar 193 is welded to the nut 208. By disconnecting the bolts 194 and 196, the bar can be adjusted longitudinally of the piston rod 207 by turning of the nut 208, after which the lock nut 209 is employed to rigidify the attachment.

*Hydraulic system*

Referring particularly to Figure 11, temperature-controlled oil of proper viscosity is drawn from the reservoir 87 through the two filters 93 by the low-pressure pump 94 and the high-pressure pump 95 simultaneously driven by motor 96. The low-pressure pump 94 discharges to a pressure regulator, shown as comprising a pressure relief valve 215 which by-passes oil to reservoir-return pipe 216 in such amount as to maximize the pressure in the low-pressure line 111 leading to the governor-pump intake passage 110 of the governor mounting pad 100. The pressure relief valve 215 is usually set to simulate pressures derived from the engine oil pump 45, e. g., at about 50 lbs./sq. in. A low-pressure gauge 218 registers the pressure in low-pressure line 111 immediately beyond a valve 219 in this line. The pipe 203 leading to the outboard chamber 202 of the hydraulic actuator 84 joins the low-pressure line 111 ahead of the valve 219 and includes a valve 220.

The high-pressure pump 95 discharges to a pressure regulator, shown as a pressure relief valve 222, which maximizes pressure in high-pressure line 223 by by-passing oil to the reservoir-return pipe 216. The high-pressure system simulates the action of the auxiliary pump used for feathering purposes and serves other functions to be later described. Ordinarily, the pressure relief valve 222 is set to maintain the discharge pressure at about 750 lbs./sq. in. Another reservoir-return pipe 225 is connected to the high-pressure line 223 through a valve 226. The high-pressure line 223 may also be connected to the low-pressure line 111 beyond the valve 219 by opening a valve 227. A valve 228 is also disposed in the high-pressure line 223 to control the delivery of high-pressure oil to the connection 118 and hose 119 for feathering purposes, the feathering pressure being indicated on a high-pressure gauge 230.

The low-pressure oil entering the governor through the low-pressure line 111 is pressured by the governor pump 60 and discharged, under the control of the flyweight-operated pilot valve 55, through the pipe 113. This pipe includes a valve 232 and delivers the governor-pump-pressured oil to a pressure relief valve 233 which maximizes the pressure in the pipe 206 leading to the inboard chamber 205 of the hydraulic actuator 84. The pressure relief valve 233 is set to relieve excessive pressures by discharging into the reservoir-return pipe 225, the setting of this valve 233 being above the normal output pressure of the governor pump, e. g., at about 100 lbs./sq. in., this valve thus being normally closed during automatic operation of the system.

The pressure of the oil discharged from the governor is indicated on a pressure gauge 235 communicating with a pipe 236 which opens on the pipe 113 ahead of the valve 232 and which contains a valve 237. The pipe 206 is primarily a pressure line, transmitting the governor-pump pressure to the hydraulic actuator 84, the main stream of oil discharged from the governor pump flowing through the pipe 236, in which the pressure is maximized by a pressure relief valve 238, and thence to an integrating-type flow meter 240 before being returned to the reservoir 87. The flow meter 240 indicates the total flow and drives a small generator, not shown, which delivers to a meter 241 on the control panel a potential which is a function of the rate of flow, whereby this meter can be calibrated in terms of quarts per minute. A switch button 241a operates a switch delivering this potential to the meter 241 so that pressing of this button gives a reading of instantaneous flow rate. If for any reason the pressure on the pipe 236 exceeds the setting of the pressure relief valve 238 (which is usually set at about 200 lbs./sq. in.), the excess pressure is relieved into the lefthand end of reservoir-return pipe 225.

To simulate transfer ring leakage when testing or setting the governor for high or low R. P. M., a small pipe 242 extends from the pipe 113 to the pipe 236 and includes a small fixed-sized, sharp-edged orifice 243 of a diameter of about .031 inch so as to substantially duplicate the normal transfer ring leakage of about 1 quart/min. Flow through the pipe 242 is controlled by a manual valve 244 and return flow is prevented by a check valve 245. The pressure in the pipe 242 ahead of the valve 244 corresponds to the pressure in the pipe 113 beyond the valve 232.

The internal leakage from the governor discharges into the chamber 102 of the governor mounting pad 100 and through the pipe 117 to a flow meter 250 discharging through a pipe 251 to the reservoir 87. This flow meter 250 is positioned behind a hinged door 251a on the front of the test stand (see Figure 4). It is preferably of the type including a graduated glass cylinder 252 conducting the oil stream. In this oil is submerged a float 253 which has a density greater than that of the oil, thus tending to drop in the cylinder 252, but which is carried upward by the rising oil to a position which is a function of the rate of flow of the oil in the pipe.

For the purpose of testing the "double-acting" governor, pipe 115, communicating with the outboard output passage 114 of the pad 100, extends to a pressure gauge 255 and thence through a manually-operated valve 256 to a pressure relief valve 257. The pressure in the pipe 115 is normally transmitted through the pipe 204 to the pipe 203 and the outboard chamber 202 of the hydraulic actuator 84, but the pressure relief valve 257 relieves excess pressures to the pipe 258 joining the reservoir-return pipe 225. The pressure relief valve 257 is normally set at about 100 lbs./sq. in.

*Electrical system*

The electrical system is energized from a three-phase line 270, the test stand providing a receptacle 271 (Figure 3) into which such a line can be plugged. Line voltage is conventionally 230 volts. A master control contacter 272 energizes and deenergizes the entire electrical system. This contacter may be of any of the well-known solenoid-operated, so-called magnetic contacters including conventional thermal overload means 274 in the holding circuit and including a start button 275 and a stop button 276 which, when depressed, respectively close and open the contacts of the contacter 272 to energize and deenergize the entire electrical system.

Figure 12:
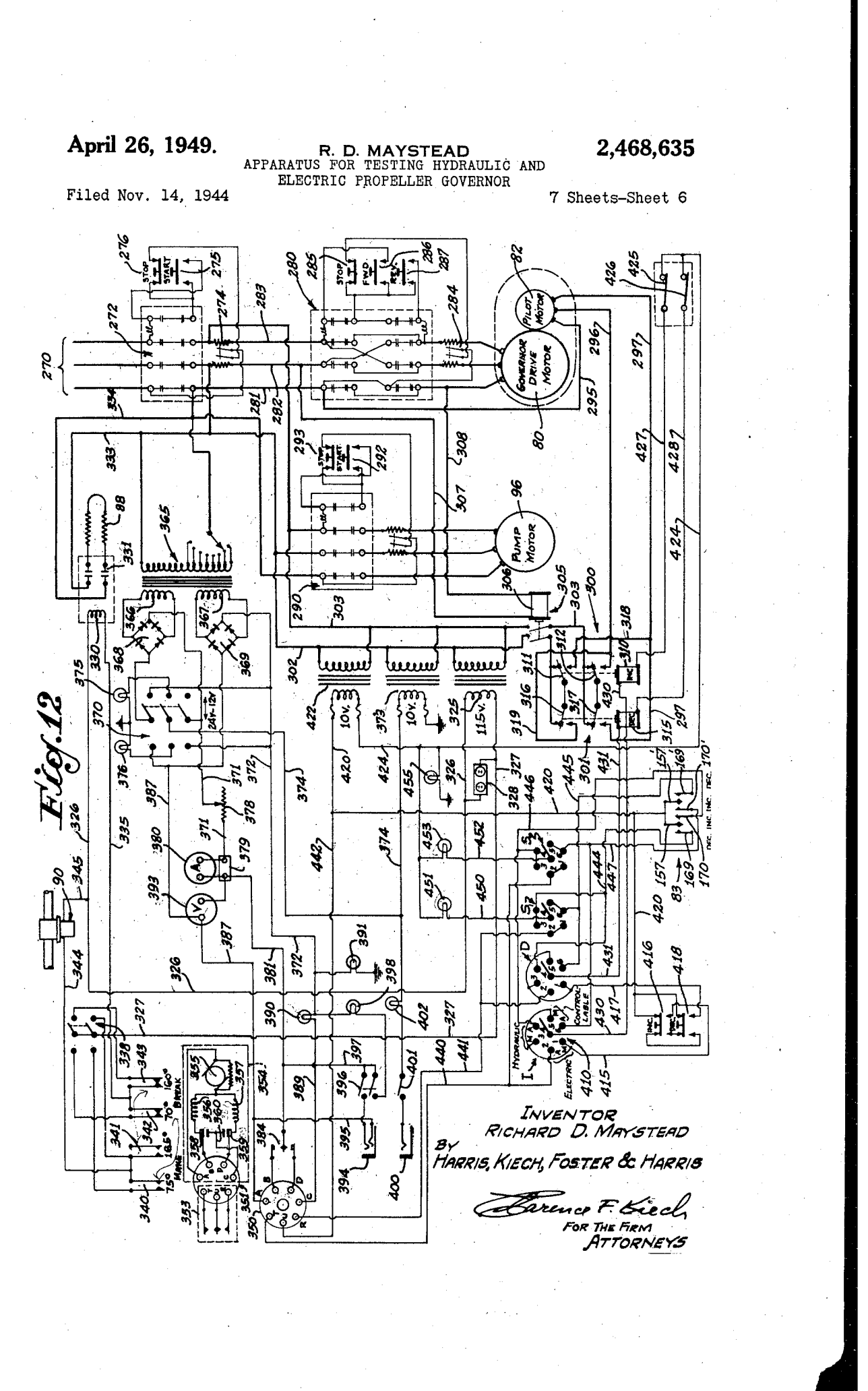

A drive motor contacter 280 is connected by conductors 281, 282, and 283 with the master control contacter 272 and controls the forward or reverse operation of the motor 80, which is of the three-phase reversible type, to provide for the testing of right-hand-rotation or left-hand-rotation governors. The drive motor contacter 280 may be of any well known type capable of stopping and starting the motor 80 and controlling its direction of rotation. As suggested in Figure 12, it includes conventional thermal overload means 284 in the holding circuit and includes a stop button 285, a forward button 286, and a reverse button 287. By momentarily pressing the forward button 286, the motor 80 is phased to operate in a forward direction until the stop button 285 is pressed. By momentarily closing the reverse button 287, the motor is phased to operate in a reverse direction.

A pump motor contacter 290, similar to the master control contacter 272, is respectively connected to conductors 281, 282, and 283 to control the energization of the pump motor 96, which is of the three-phase type. It provides a start button 292 and a stop button 293 for controlling the operation of the pump motor.

The pilot motor 82 may be any desired reversible-type electric motor. A three-phase motor is illustrated, with one supply conductor 295 joined with the conductor 281 and the other supply conductors 296 and 297 extending to increase and decrease relays 300 and 301 and thence to conductors 302 and 303 joining conductors 282 and 283, respectively. Included in the circuit provided by conductors 302 and 303 is a relay 305 which closes only when the main motor 80 is operating in either a forward or reverse direction, this being accomplished by connecting a solenoid 306 across the drive motor contacter 280 to be energized by one of the three phases when the contacter is closed, e. g., by use of conductors 307 and 308, as shown.

The increase relay 300 includes a solenoid 310 operating two single-pole, double-throw switches having blades 311 and 312 normally respectively engaging upper contacts but movable upon energization of the solenoid 310 to engage their respective lower contacts. Similarly, the decrease relay 301 includes a solenoid 315 operatively connected to two single-pole, double-throw switches having blades 316 and 317 normally engaging their upper contacts but movable to engage their lower contacts upon energization of the solenoid. When the relay solenoids 310 and 315 are deenergized, no potential is applied to the conductors 296 and 297. When the solenoid 310 of the increase relay 300 is energized, current flows from conductor 302 through blades 316 and 311 and through a conductor 318 to the conductor 297. The return circuit for the control phase of the motor 82 is from conductor 296 through blades 312 and 317 to conductor 303. Energization of the solenoid 315 of the decrease relay 301 reverses the control phase of the motor 82. In this condition, current from conductor 302 flows through blades 311 and 316, through conductor 319 to conductor 296, the return circuit being from conductor 297 through blades 317 and 312 to the conductor 303. Selective energization of the solenoids 310 and 315 is possible either manually or automatically, as will be hereinafter described.

The temperature-control circuit for operation of the heating unit 88 and the solenoid-operated valve 90 of the cooling unit 89 includes a transformer 325 providing a primary winding connected between the conductors 302 and 303, and a secondary winding connected to conductors 326 and 327 across which is connected a receptacle 328 for the circuits of the chrono-tachometer system 128, 129. The conductor 326 extends to a solenoid 330 of a magnetic contactor 331. When the solenoid 330 is energized, the contactor 331 energizes the heating unit 88 by connecting it across conductors 333 and 334 connected across one phase of the output potential from the master control contactor 272. The remaining terminal of the solenoid 330 is connected by conductor 335 to a thermostatic switch means. In understanding the operation of this thermostatic switch means, it should be recognized that the invention is designed for selective use of two oils of different normal viscosity. For example, if the reservoir 87 is filled with SAE 10 oil, it is desirable that the temperature be controlled to lie between about 70° F. and 75° F. If SAE 50 oil is employed, the temperature giving the desired viscosity will be between about 160° F. and 165° F. A double-throw, double-pole switch 338 is thrown to the left when the former oil is employed and to the right when the latter oil is employed. Both blades of this switch are connected to conductor 327.

The thermostatic switch means includes four thermostatic switches 340, 341, 342, and 343 submerged in the oil in the reservoir 87, or with thermostatic control units submerged in the oil. The switches 340 and 341 respectively close at 75° F. and 165° F., while the switches 342 and 343 respectively open at 70° F. and 160° F. The first two switches are in circuit with the solenoid-operated valve 90 through conductors 344 and 345, while the second two switches are in circuit with conductor 335.

The operation of the thermostatic switch means is as follows. With the switch 338 thrown to the left and with SAE 10 oil in the system at a temperature below 70° F., current flows from conductor 327 through the upper blade of switch 338, the thermostatic switch 342, conductor 335, and through the solenoid 330, returning to the transformer 325 through conductor 326. This energizes the heating unit 88. When the temperature reaches 70° F., the thermostatic switch 342 opens this circuit and deenergizes the heater 88. Should the temperature rise to 75° F. for any reason, such as continued operation of the test stand, the thermostatic switch 340 closes to complete a circuit from conductor 327 through the lower switch blade, the thermostatic switch 340, conductor 344, solenoid-operated valve 90, and conductor 345, the current returning through conductor 326 to the transformer 325. This opens the solenoid-operated valve 90 and starts the flow of cooling liquid, which continues until the temperature drops below 75° F. With SAE 50 oil in the system and the switch 338 thrown to the right, circuits similarly traceable are completed through the thermostatic switches 341 and 343 to maintain the temperature between about 160° F. and 165° F. Temperatures of the oil in the reservoir are indicated by a conventional-type oil temperature gauge 348 on the control panel, while the level of the oil in the reservoir is indicated by a conventional gauge 349 on the control panel.

In the testing of electrical propeller governors or hydraulic governors employing electrical control equipment, such as the electric head previously described for adjusting the speed setting of the governor, various power sources, both A. C. and D. C., are desirable. The invention provides an electrical receptacle 350 for connection to electrical governor equipment through a plug 351 insertable into the receptacle. Connections T, U, and R are used for testing electric-type governors. As suggested within dotted line 353 associated with the plug 351, the circuits within these electric governors are essentially a single-pole, double-throw switch operated by flyweights, the side contacts being connected to T and R and the intermediate contact, moved by the flyweights, being connected to U. Connections A, B, C, and D of the receptacle 350 are used for testing electric heads on hydraulic governors. Essentially, the electrical circuits within such electric heads are shown within dotted lines 354 associated with the plug 351. The electric head includes a geared-down, series-connected electric motor which, in effect, adjusts the tension of the speeder spring 79 previously described. This motor has an armature 355 and field coils 356 and 357 adapted, when selectively energized, to rotate the armature in opposite directions. These field coils are connected through limit switches 358 and 359, normally in the position shown, to connections B and D, while the armature 355 is joined with connection A. When the limit of motion in either direction is reached, the limit switches 358 and 359 are selectively actuated to close the circuit from connections B or D (depending upon the limit switch which is actuated) through a conductor 360 leading to connection C.

Figure 2:
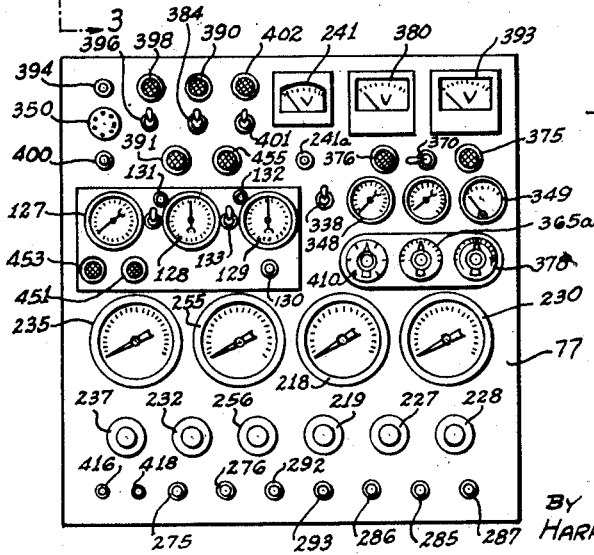
Figure 2 is a face view of the control panel.

When testing such electrical equipment, there is need sometimes for 12-volt D. C. current and at other times for 24-volt D. C. current obtained selectively as follows. A transformer 365 provides a tapped primary winding connected between conductors 333 and 334, changing of taps being for voltage adjustment of two secondary windings 366 and 367 and being made by turning knob 365a (Figure 2). Bridge rectifiers 368 and 369 are connected respectively across the secondary windings, the output of each bridge rectifier being 12 volts. A three-pole, double-throw switch 370 is designed to deliver either 12-volt or 24-volt potentials to the equipment. The connections of this switch are conventional so far as concerns the outer blades and terminals. When thrown to the right, the output of rectifier 368 is connected across the supply leads 371 and 372. When the switch 370 is thrown to the left, the rectifiers 368 and 369 are connected in series, through the outer blades of the switch, between these supply leads. The central blade of the switch is energized from the secondary winding of a transformer 373 through a conductor 374 to complete circuits through signal lamps 375 and 376, as indicated, when the switch 370 is thrown respectively to the right or to the left. These signal lamps indicate to the operator whether 12-volt or 24-volt potentials are being applied to the equipment.

The supply lead 371 includes a variable resistor 378 for minor adjustments of current or potential, this variable resistor being connected to a shunt 379 of an ammeter 380. Current from the far side of the shunt 379 flows through a conductor 381 to the movable blade of a single-pole, double-throw toggle switch 384 which operates the motor of the electric head of the governor under test. Thus, when this switch is thrown upward, current flows through connection B to winding 356 and armature 355 in series, returning through connection A and thence through conductor 387 to voltage-changing switch 370. This operates the motor of the electric head in one direction until the limit switch 358 operates to open the motor circuit and close the circuit from connection B through the limit switch, conductor 360, connection C, and a conductor 389 to one terminal of a signal lamp 390, the other terminal being connected to supply lead 372. Conversely, when the switch 384 is thrown downward, the motor of the electric head operates in a reverse direction until the limit switch 359 opens the motor circuit and completes the previously-defined circuit through the signal lamp 390. A signal lamp 391 is connected between ground and the supply lead 372. The illumination of this signal lamp indicates the presence of a grounded condition. A voltmeter 393 is connected between the leads 381 and 387 to indicate the voltage applied to the motor of the electric head.

A jack 394 receives a plug during testing of the "double-acting" governor and acts as a power source for the solenoid valve on such governor, this valve functioning to control the supply of oil for feathering. One terminal of the jack is connected to lead 397 through a conductor 395. The other jack terminal is connected through a double-pole, single-throw, blade-connected switch 396, to the conductor 381 through a conductor 397. The lower blade energizes a signal lamp 398 connected to the supply lead 372. Similarly, a jack 400 receives a plug extending to the cut-out switch on the feathering control of a hydraulic-type governor, which cut-out switch is conventionally mounted on the side of the governor. The jack 400 is energized through a switch 401 in series with a signal lamp 402 and the conductor 374 extending to the transformer 373, the circuit being completed through ground.

To provide for manual and automatic control of the speed of the governor during test and to provide for the selective testing of different-type governors, the invention employs a selector switch 410. This selector switch is preferably of the rotary type and provides four banks of switch elements connected by a common shaft. The first bank, shown to the left on Figure 12, comprises an increase-speed bank designated by the letter I. The second bank comprises a decrease-speed bank and is designated by the letter D. The third bank comprises a signal bank $S_1$, and the fourth bank comprises a signal bank indicated by $S_2$. Each bank includes a rotary blade selectively engaging six peripheral contacts, designated respectively as contacts 1, 2, 3, 4, 5, and 6. All of the switch blades are mounted on a common shaft to move in unison. The contacts 1 to 6 of each bank correspond to six positions of the selector switch. Positions 1 and 2 are respectively for manual and automatic operation of electric-type governors undergoing test. Positions 3 and 4 are respectively for manual and automatic operation of hydraulic-type governors undergoing test, and are employed for testing "Hydromatic," "accumulator" and "double-acting" governors such as previously mentioned. Positions 5 and 6 are respectively for manual and automatic operation of those hydraulic governors known as "controllable" or "constant speed" governors, such as previously mentioned and which are undergoing test.

On bank I, contacts 1, 3, and 5 are electrically common, as shown, and are connected by a conductor 415 to a lower contact of an "increase" pallet switch 416, the pallet normally closing the upper contacts as shown, but being manually depressible to close the lower contacts. Similarly, on bank D, contacts 1, 3, and 5 are electrically common and are connected by a conductor 417 with one of the lower contacts of a "decrease" pallet switch 418, this pallet normally closing the upper contacts as shown but being manually depressible to close the lower contacts. One of the upper contacts of each of the switches 416 and 418 is connected by a conductor 420 to the intermediate contacts 157 and 157' of the automatic control unit 83 and to the secondary winding of a transformer 422, the primary of which is connected between conductors 302 and 303. The remaining terminal of this secondary winding is connected by conductor 424 to limit switches 425 and 426 of the pilot motor 82, these switches being of the conventional type and being respectively opened when the control shaft 137 of the variable-speed transmission 81 reaches desired extreme positions. These limit switches serve merely to deenergize the pilot motor 82 to prevent its continuing the operation of the control shaft 137 beyond the operating limits of the variable-speed transmission. The limit switch 425 is connected to one terminal of the solenoid 310 of the increase relay 300 through conductor 427. Similarly, limit switch 426 is connected through conductor 428 to the solenoid 315 of the decrease relay 301. The remaining terminal of the solenoid 310 is connected by conductor 430 to the blade of bank I. The remaining terminal of the solenoid 315 is connected by conductor 431 to the blade of bank D.

Contact 2 of bank I and contacts 1 and 2 of bank $S_2$ are electrically connected by a conductor 440 to connection T of receptacle 350. Contact 2 of bank D and contacts 1 and 2 of bank $S_1$ are common and are connected by a conductor 441 to connection R of this receptacle. Connection U connects through a conductor 442 with conductor 429 leading to the transformer 422. Contacts 3 and 4 of bank $S_1$ and contact 4 of bank D are interconnected and extend to "decrease" contact 169 of the automatic control unit 83 through a conductor 444. Contacts 5 and 6 of bank $S_1$ and contact 6 of bank D are electrically joined and connected by a conductor 445 to "decrease" contact 169' of the automatic control unit. Contacts 3 and 4 of bank $S_2$ and contact 4 of bank I are electrically common and are connected through a conductor 446 to "increase" contact 170 of the automatic control unit. Contacts 5 and 6 of bank $S_2$ and contact 6 of bank I are electrically common and are connected through conductor 447 to "increase" contact 170' of the automatic control unit.

A simple indicator circuit is employed to indicate selective energization of solenoid 310 of the increase relay and solenoid 315 of the decrease relay. Thus, the blade of bank $S_1$ is connected through a conductor 450 through signal lamp 451 to conductor 424 to be in parallel with the solenoid 315 of the decrease relay. The blade of bank $S_2$ is connected through a conductor 452 and a signal lamp 453 to the conductor 424 to be in parallel with the solenoid 310 of the increase relay. A ground-indicating signal lamp 455 is connected between a ground on the frame of the test stand and the conductor 424. Its illumination indicates a grounded condition in the equipment being tested and which, except when testing the solenoid on a double-acting governor where a ground should be indicated, should be corrected before proceeding with the test.

*Operation of automatic control means*

The operation of the automatic control means will be exemplified with reference to the type of governor shown in Figures 13 and 14. Assuming that this governor has been connected to the pad 100 and that oil, at substantially engine pressure, is being supplied thereto through pipe 111 from the low-pressure pump 94, it will be evident that an overspeed condition will raise the pilot valve 55 to discharge high-pressure oil from the governor pump 60 through pipes 113 and 206 to the inboard chamber 205 of the hydraulic actuator 84. This moves the piston 200 leftward, as viewed in Figure 10. Oil from the outboard chamber 202 is expelled through the pipe 203 through now-open valve 220 into the pipe 111 in which the pressure is regulated to simulate normal engine pressure.

Leftward movement of the piston 200 turns the gear 189 clockwise (viewed downwardly), thus turning both control drums 160 and 160' counter-clockwise. This brings the "decrease" contact 169 into electric engagement with the intermediate contact 157 carried by the control drum 150. The selector switch 410, having previously been set at position 4 (corresponding to automatic operation for this type of governor), a circuit is completed from the transformer 422 through the conductor 420, intermediate contact 157, "decrease" contact 169, and through conductor 444 to contact 4 of bank D of the selector switch, the current then flowing through the blade of this bank through conductor 431 to the solenoid 315 of the "decrease" relay, thence through the conductor 428, limit switch 426, and conductor 424 to the transformer. This closes the contacts of the "decrease" relay and causes the pilot motor 82 to revolve the control shaft 137 of the variable-speed unit counter-clockwise, i. e., in a direction reducing the speed of the governor. Counter-clockwise rotation of the control shaft 137 moves the upper control drum 150 counter-clockwise until the intermediate contact 157 separates from the "decrease" contact 169, whereupon the pilot motor 82 is deenergized. The momentum of the pilot motor is sufficient to bring the intermediate contact 157 substantially to its centralized position between the contacts 169 and 170.

A very slight leftward movement of the piston 200 of the hydraulic actuator will cause substantial movement of the lower control drum 160 due to the step-up gear ratio between the gear 180 and the pinion 174. In fact, the "decrease" contact 169 moves sufficiently not only to touch the intermediate contact 157 but to displace it and cause it to follow the movement of the "decrease" contact 169 until the piston 200 stops its leftward movement, i. e., when the governor reaches an onspeed condition to close its pilot valve 55. This bodily movement of the intermediate contact 157 to a new position is readily understandable when it is remembered that the upper control drum 159 is frictionally coupled to the shaft 146 through frictional engagement with the surface 179 of the gear 148 when pressed thereagainst by the spring 178. The lower control drum 160, on the other hand, is free to rotate on the shaft 146 but is positively geared to the oscillating shaft 181 which partakes of the motion of the hydraulic actuator 84 so as to be solely dependent upon the hydraulic actuator for its rotation. So long as the overspeed condition exists, the "decrease" contact 169 is thus moving the intermediate contact 157 counter-clockwise and the rate of counter-clockwise turning of the shaft 146 or the control shaft 137 is insufficient to break the contact during such movement. However, as soon as the pilot valve 55 of the governor closes (representing an onspeed condition), the intermediate contact 157 is drawn away from the "decrease" contact 169 to interrupt the circuit to the pilot motor 82, as described, and the momentum of the pilot motor 82, as described, and the momentum of the pilot motor moves the intermediate contact 157 to a new, approximately-central position between the contacts 169 and 170.

An underspeed condition of the governor lowers the pilot valve 55 and permits rightward movement of the piston 200 of the hydraulic actuator under the influence of engine-pressure oil from pipe 111 through pipe 203. Oil is displaced from inboard chamber 205 through the pipe 206 and pipe 113, thence through the now-open pilot valve 55 and into the chamber 102 of the pad 100 to drain through the pipe 117, flow meter 250, and pipe 251 to the reservoir 87.

The resulting rightward movement of the piston 200 turns the lower control drum 160 clockwise to bring the "increase" contact 170 into pressural and advancing relationship with the intermediate contact 157 to energize the solenoid 310 of the increase relay as follows. Current from the transformer 422 flows through conductor 420, contacts 157 and 170, and conductor 446 through bank I of the selector switch, conductor 430, solenoid 310 of the increase relay, conductor 427, limit switch 425, and conductor 424. This energizes the pilot motor 82 to revolve the control shaft 137 clockwise, i. e., in a direction increasing the speed of the governor. When the governor reaches an onspeed condition, the motion of the piston 200 stops, the intermediate contact 157 separates from the "increase" contact 170 to break the circuit, and the pilot motor 82 coasts sufficiently to substantially centralize the intermediate contact 157 with respect to the contacts 169 and 170.

So long as the governor remains in an onspeed condition, there is no movement of the piston 200 sufficient to close either energizing circuit of the pilot motor 82, whereby the driven speed of the governor remains as determined by the automatic control.

When testing "controllable" governors, compensation must be made for the opposed hydraulic relationships as compared with the "Hydromatic" governor. When the "controllable" governor is in overspeed condition, the pilot valve in the governor releases oil from the inboard chamber 205, allowing the oil pressure in the outboard chamber 202 to force the piston 200 rightward. This revolves the gear 180 counter-clockwise and the control drum 160' clockwise. This action brings "decrease" contact 169' against the intermediate contact 157' to energize the decrease relay. This causes the pilot motor to revolve the control shaft 137 clockwise to reduce the speed of the governor. It also turns the control unit 150' clockwise to interrupt the circuit when an onspeed condition is obtained.

When such a "controllable" governor is operating in an underspeed condition, the pilot valve within the governor allows high-pressure oil to enter the inboard chamber 205, forcing oil from the outboard chamber 202 and moving the piston 200 leftward. This action revolves the control unit 160' counter-clockwise, bringing the "increase" contact 170' into engagement with the intermediate contact 157'. This causes the pilot motor to increase the speed until the pilot motor circuit is interrupted by counter-clockwise rotation of the control unit 150'.

*Typical test procedures*

In testing all of the above-mentioned types of hydraulic governors, the governor is properly mounted on the pad 100 and the apparatus started under conditions for manual control, as follows. Valves 219, 232, and 244 are opened, all other valves being closed. Selector switch 410 is turned to the "manual" position corresponding to the hydraulic-type governor being tested, i. e., at positions 3 or 5. Master "start" switch 275 is closed momentarily to energize the system, and the pump is started by momentarily closing "start" switch 292 after the oil has been brought to the correct temperature by closing the switch 332. Thereafter, either "forward" switch 286 or "reverse" switch 287 is momentarily closed, depending upon whether the rotation of the governor being tested is clockwise or counter-clockwise. The governor will now be rotated by the drive unit at a speed determined by the setting of the variable-speed transmission. Low-pressure oil will be supplied to the governor through the pipe 111 and the oil pressure in the pipe 113 will cause a small flow through the fixed orifice 243, if valve 244 is open, to duplicate transferring leakage.

To test the low stop setting of the governor while employing manual control, the control pulley 67 of the governor is turned to low R. P. M. position. "Decrease" switch 413 is then depressed to energize the decrease relay and rotate the pilot motor in a direction to decrease the speed of the governor. Assuming for the moment that the "Hydromatic" governor of Figures 13 and 14 is being tested, the selector switch then being at position 3, the governor is operating in an overspeed condition and two circuits are closed as follows: An energizing circuit for the pilot motor 82 is completed from the transformer 422 through conductor 420, closed upper contacts of "increase" switch 416, now-closed lower contacts of "decrease" switch 418, conductor 417, bank D of the selector switch, conductor 431, solenoid 315 of decrease relay 301, and thence through the limit switch 426 and conductor 424 to the transformer. A signal circuit is also completed from the conductor 420, intermediate contact 157, "decrease" contact 169, conductor 444, bank $S_1$ of the selector switch, conductor 450, signal lamp 451, and conductor 424. Energization of the decrease relay 301 reduces the driving speed so long as the "decrease" switch 418 is depressed. However, when the governor speed reaches the low stop setting, the pilot valve of the governor closes, evidencing an onspeed condition which stops the operation of the hydraulic actuator and, as previously described, breaks the engagement between the intermediate contact 157 and the "decrease" contact 169. In manual operation, this merely deenergizes the signal lamp 451. The pilot motor will tend to continue its rotation until stopped by opening of the limit switch 426 or the "decrease" switch 418. When operating the system by manual control, it is usually impossible to stop the pilot motor by releasing the switch 418 at the exact instant an onspeed condition is achieved. Rather, the switch 418 is held closed until the signal lamp 451 goes out and signal lamp 453 immediately illuminates through a circuit including the intermediate contact 157, "increase" contact 170, and bank $S_2$ of the selector switch. By then alternately and momentarily closing "increase" switch 416 and "decrease" switch 418, the operator will be able to extinguish both signal lamps 451 and 453, at which time the governor is rotating in onspeed condition and the low R. P. M. reading may be observed from the tachometer 127 and checked more accurately on the counter 128 and timer 129 of the chronotachometer system.

When testing the high stop setting of the governor while employing manual control, the control pulley 67 of the governor is turned to high R. P. M. position against its stop and "increase" and "decrease" switches 416 and 418 are actuated until both signal lamps 451 and 453 extinguish, indicating an onspeed condition of the governor. Again, the high R. P. M. reading may be taken from the tachometer and checked with the counter and timer.

Usually, such tests for setting of the low stop and high stop of the governor are made with the system set for automatic operation, thus eliminating any necessity for manipulation of the "increase" and "decrease" switches 416 and 418. To do this, the selector switch 410 is turned to the "automatic" position corresponding to the governor being tested, e. g., at point 4 for a "Hydromatic" governor. The contacts in the automatic control unit 83 then become operative to bring the governor promptly and automatically to an onspeed condition at the low stop and high stop settings, as will be apparent from the previous description as to the operation of the automatic control means. It is usually preferable always to start the test stand when set for manual operation and then to turn the selector switch to the corresponding automatic position.

When testing double-acting governors in the above tests, valves 220 and 244 should be closed and valve 256 opened. This connects the outboard chamber of the hydraulic actuator 84 with the outboard output passage 114 of the pad 100 through pipes 115 and 204, this type of governor thus controlling the pressure in the outboard chamber as well as in the inboard chamber, the latter control being through pipes 113 and 206, as previously mentioned.

In making recovery tests on all hydraulic governors, the test stand is set for manual operation and "increase" and "decrease" switches 416 and 418 are operated to bring the speed of the governor to one of the limits of the recovery test, conventionally 2000 R. P. M. The control pulley 67 of the governor is then turned until signal lamps 451 and 453 are extinguished, indicating that the governor is onspeed, the location of the control pulley being suitably marked. By switches 416 and 418, the speed of the governor is then brought to the other limit for the test, conventionally 2400 R. P. M., and the governor control pulley 67 rotated until the same signal lamps are extinguished, indicating an onspeed condition, the location of the control pulley being again marked. The selector switch 410 is then turned to the "automatic" position corresponding to the governor under test, and the valve 232 is opened. This places the system in "automatic" operation. The control pulley is then moved from its latter position (2400 R. P. M.) to the marked former position (2000 R. P. M.) quickly, while at the same instant starting the timer 129 by pressing the start button 130. The automatic operation reduces the speed and the signal lamps 451 and 453 will alternately come on near the onspeed condition as the governor conditions stabilize. At the instant both signal lamps are extinguished, the button 130 is again pressed, thus stopping the timer. The intervening time should not exceed a standardized figure, usually 15 seconds, if the recovery of the governor is to be satisfactory. Further, the governor should not pass the setting more than four times, as indicated by the signals of lamps 451 and 453. The foregoing procedure is then repeated, with the setting being suddenly reversed from the lower speed (e. g., 2000 R. P. M.) to the higher speed (e. g., 2400 R. P. M.).

Propeller governors are usually "counterbalanced" so that, if the cable to the speed control pulley breaks, the governor will automatically change the pitch of the blades to that desired for cruising or some other predetermined flight condition. The counterbalance spring 70a at the extreme upper end of Figure 14, opposing the speeder spring 70, serves in this capacity. The counterbalance R. P. M. is usually checked from low speed position and from high speed position. In the former and with the system adjusted for automatic control, the control pulley 67 is turned toward low R. P. M. position until the governor automatically controls and operates at about 1500 R. P. M., whereupon the control pulley is released from manual engagement. It will then move slightly one way or the other and stop. When signal lamps 451 and 453 are extinguished, indicating an onspeed condition, the counterbalance R. P. M. can be read from the tachometer 127. When tested from high speed position, the pulley is turned until the governor operates at approximately 2500 R. P. M., being then released and the counterbalance R. P. M. being read from the tachometer when the signal lamps 451 and 453 are extinguished.

The above tests apply to all of the hydraulic-type governors. The following additional tests can be made on "Hydromatic" and "controllable" governors.

In testing the capacity of the governor pump, the test stand is adjusted for "manual" operation and the control pulley 67 of the governor is turned to low R. P. M. position. The governor speed is then brought to about 1750 R. P. M. by operating switches 416 and 418. At this time, oil is being delivered to the governor through the pipe 111 and discharged from the governor pump through the pipe 113. Valve 232 being closed, the flow is through the valve 237 to the reservoir 67 through the flow meter 240. The valve 237 controls the back pressure against the pump and is adjusted until this pressure, read on the pressure gauge 235, is 150 lbs./sq. in. The capacity of the governor is then read on the meter 241 connected to the flow meter 240. This capacity must be within limits specified for the particular governor.

The relief pressure test is to determine the pressure at which the relief valve 65 of the governor opens and is usually performed when the governor is running at 1750 R. P. M., the control pulley being in minimum position to insure operation of the governor in overspeed condition. The valve 237 is now completely closed and the governor pressure, determined by the pressure relief valve 65, is read from the pressure gauge 235.

The external leakage test determines the presence of external leakage from the governor when subjected to high pressure. Valve 237 is closed and valve 227 is opened to deliver oil from the high-pressure line 223 to the pipe 111, the valve 219 being closed. This transfers high-pressure oil to the pipe 111. The valve 227 is adjusted until the pressure gauge 235 reads 400 lbs./sq. in. At this pressure, there should be no external leakage for approximately one minute. If external leakage pressure is the same as relief pressure, valve 227 need not be used and the external leakage test can be conducted without employment of auxiliary pressure from the high-pressure line 223.

The internal leakage test determines internal leakages of the governor. In making this test, the valve 237 is adjusted so that a predetermined pressure is applied to the governor, usually until the pressure gauge 235 indicates 150–200 lbs./sq. in. Leakage will be through the pipe 117 and flow meter 250, the latter being readable to determine the leakage rate and, correspondingly, the condition of the valves, etc., within the governor.

Feathering tests are made by connecting the flexible hose 119 to the high-pressure port 72 of the governor. The test stand is started in "manual" control and the governor pulley is turned to bring the speed to approximately 2000 R. P. M. by operation of switches 416 and 418. Valve 226 is closed at this time so that the output of the high-pressure pump, controlled by the pressure regulator 222, is delivered to the valve 228. This valve 228 is then opened until the pressure, indicated on the gauge 230, is sufficient to open the feathering or high-pressure valve 74 of the governor. When this valve opens, there will be an increased flow through pipes 112 and 256, which can be noted on the meter 241 connected to the capacity flow meter 240.

In checking the cut-out switch in the feathering control, the cut-out switch connection is electrically connected to a cable extending to a plug which is inserted in the cut-out jack 400. The test stand is started in "manual" control and the control pulley 67 is adjusted until the governor speed is approximately 2000 R. P. M., the governor being placed "onspeed" by operation of switches 416 and 418, previously described. The switch 401 is closed to send current to the cut-out switch on the governor and this will illuminate the signal lamp 402. With the valve 226 closed, valve 228 is opened and valve 237 is slowly closed until the pressure on the gauge 235 reads approximately 500–600 lbs./sq. in., according to the type of cut-out switch being tested. When the cut-out switch opens, the signal lamp goes out and the pressure at this instant can be read on the gauge 235. Valve 237 is then slowly opened and, when the signal lamp 402 illuminates, showing that the cut-out switch has again closed, the pressure can be read on the gauge 235.

In testing high-pressure "accumulator" type governors, the capacity test, pressure relief test, external leakage test, and internal leakage test are made substantially as above, with the governor operating at a back pressure of about 150 lbs./sq. in. and at a supply pressure of 40 plus or minus 15 lbs./sq. in., the governor speed being adjusted to 1750 R. P. M. by use of switches 416 and 418. The opening and closing pressure of the accumulator shut-off valve of such a governor can be tested by connecting the high-pressure hose 119 to the accumulator port and turning the control pulley of the governor to minimum speed position. The valve 237 is closed and the relief pressure of the accumulator shut-off valve can be read from the pressure gauge 235. Valve 228 is then closed until the gauge 230 reads 230–300 lbs./sq. in., or as otherwise specified. When the shut-off valve opens, the gauge 230 will show a rise in pressure. Valve 228 is then slowly opened until the gauge 230 reads 150–240 lbs./sq. in., or as otherwise specified for the test. When the shut-off valve closes, the gauge 230 will read a drop in pressure, the pressure just before the drop being the closing pressure.

In testing "double-acting" governors, valves 232, 226, and 244 are closed. The capacity test is made at a back pressure of 150 lbs./sq. in. and a supply pressure of 40 plus or minus 15 lbs./sq. in. With the governor running at overspeed condition, the valve 237 is adjusted so that the gauge 235 reads approximately 150 lbs./sq. in., whereupon the pump capacity is read on the meter 241. The pressure relief test is made under similar conditions, except that the valve 237 is completely closed, whereupon relief pressure can be read from gauge 235. The control pulley of the governor is then turned to maximum R. P. M. position and the governor speed adjusted to 1750 R. P. M. so that the governor is operating at an underspeed condition. The valve 256 is then completely closed and relief pressures are read on the gauge 255. The external leakage test is made with the governor operating in overspeed condition, as mentioned above. The valve 237 is completely closed and the valve 227 opened until the pressure gauge 218 reads the required pressure. Operating for approximately one minute, there should be no external leakage. Similarly, the internal leakage test is made with the governor in the same overspeed condition, the valve 237 being adjusted until pressure gauge 235 reads 150–200 lbs./sq. in., while gauge 218 should read 40 plus or minus 15 lbs./sq. in. Internal leakage is indicated on flow meter 250.

The relief back-up selector valve of a double-acting governor can be tested by connecting the flexible hose 119 to the high-pressure port and turning the control pulley to minimum speed position. Valve 237 is closed and the pressure gauge 235 should read 150–200 lbs./sq. in. Valve 228 is opened until pressure gauge 230 read 40–50 lbs./sq. in. If the pressure indicated by the gauge 235 rises, the relief back-up selector valve is shifted. The maximum pressure required to shift this valve should be 50 lbs./sq. in. Leakage of the solenoid feathering valve can be determined by stopping the governor, opening the valve 228 until a pressure of 100 lbs./sq. in. is indicated on the gauge 230. Internal leakage can be measured by the flow meter 250, the solenoid being deenergized.

In making the feathering test on a double-acting governor, the governor is not rotated and oil under pressure is supplied to the feathering connection. Switch 396 is closed to energize this solenoid to check the operation of the feathering port check valve and the solenoid valve. The former should open when oil at about 250 lbs./sq. in. is supplied. Under this condition, oil will flow through the pipe 113 and valve 237 is closed so that the pressure is indicated on the gauge 235. When the solenoid is deenergized by opening the switch 396 and the pressure relieved below 150 lbs./sq. in., the solenoid valve should close to permit no flow to the pipe 113. Units equipped with cut-out switches can also be checked for switch-opening pressure.

Electric-type governors are commonly divided into two types, known as "proportional" governors and "lubricated pad" governors. Basically, such governors control a reversible pitch-changing electric motor through a single-pole, double-throw switch, the intermediate contact being moved in response to flyweight position. In most "proportional" governors, this movement is effected by use of an oil servo mechanism supplied with governor-pump-pressured engine oil under control of a pilot valve operated by the flyweights. While the "proportional" governors are not illustrated in the present specification, the following generalized description will be understood by those skilled in the testing thereof and will suggest, also, tests which can be made by the present invention on "lubricated pad" governors.

In testing such "proportional" governors, oil is supplied to the line 111 at a low pressure of 2–3 lbs./sq. in. (read on gauge 218) by opening valve 219 sufficient to accomplish this. To adjust the valve of such governors, they should first be operated at about 2000 R. P. M., after which the quadrant lever should be moved from high R. P. M. to low R. P. M. position. The pressures obtained in the servo cylinder must vary from less than 5 to greater than 75 lbs./sq. in and will be indicated by installation of the inspectors' test pressure gauge on the governor. If the minimum pressure is not obtained, shims are removed; if maximum pressure is not obtained, shims are added. The double contacts of the governor should be adjusted so that an oil pressure in the servo cylinder of 10–12 lbs./sq. in. will give the full indication on the correct R. P. M. contact. If the oil pressure is greater than 12 lbs./sq. in., shims are removed from the double contact. If the oil pressure is less than 10 lbs./sq. in., shims are added.

One important advantage of the present invention is its ability to use the single-pole, double-throw switch of electric governors to control the speed of the governor drive. Thus, automatic operation can be obtained by moving selector switch 410 to position 2, whereupon "increase" and "decrease" relays 300 and 301 are respectively controlled by the side contacts connected to T and R, respectively. In effect, the single-pole, double-throw switch of the governor performs a function performed by the automatic control unit 83 when testing automatically hydraulic governors. At any setting of the governor, any offspeed condition will quickly be corrected by change in drive speed and the control arm of the governor can be moved to any selected position and the governor driving speed will automatically change to permit testing of actual speed of different settings.

"Proportional" electric governors are calibrated at a series of different speeds. Calibration tests involve testing of ranges at several speeds, e. g., 1200, 1500, 2000, and take-off R. P. M. The tests mentioned in this paragraph are repeated for the different speeds. For example, in making the 1200 R. P. M. tests, the governor is brought into onspeed condition registered on the tachometer 127 and indicated by extinction of signal lamps 451 and 453. The speed is then increased until "decrease" lamp 451 lights continuously. The difference in driving speeds of the governor gives the "high R. P. M. range." The "low R. P. M. range" is obtained by bringing the governor to onspeed condition, decreasing the speed until "increase" lamp 453 lights continuously, and then subtracting the speeds. The "neutral zone" is obtained as follows. Bring governor into onspeed condition, increase speed until "decrease" lamp 451 lights, then decrease speed until lamp 451 darkens. The difference between the final R. P. M. and the onspeed R. P. M. is the "neutral zone." The same test is repeated by bringing the governor to onspeed condition, decreasing speed until "increase" lamp 453 lights and increasing speed until this lamp darkens, the difference between the last speed and the onspeed condition giving the "neutral zone."

The take-off setting of the electric governor is adjusted by holding the control lever against its stop pin and adjusting the stop setting to bring to correct speed, i. e., when both lamps 451 and 453 are extinguished. Also, the low R. P. M. stop settings can be similarly adjusted on electric governors provided with remote control type head.

Such governors often employ a hydraulic safety switch which opens if the oil pressure fails. To test this, the control lever is set at "take-off" position and the governor is driven overspeed by 10 or 15 R. P. M. The oil supply to the governor is then stopped, as by closing valve 219 to open the safety switch. There should be no increase R. P. M. correction if the switch is operating properly.

Various changes and modifications can be made without departing from the spirit of the invention as defined in the appended claims.

I claim as my invention:

1. In an apparatus for testing electric propeller governors having switch means for selectively closing two circuits, the combination of: a governor mounting means; means for detachably connecting said governor to said governor mounting means; drive means for driving said governor when mounted on said mounting means; a pilot motor and means for connecting said pilot motor to said drive means to increase and decrease the speed of said governor in response to forward and rearward actuation of said pilot motor; control circuits for said pilot motor and adapted when respectively energized to actuate said pilot motor in forward and reverse directions; and means for electrically connecting said switch means of said governor to said control circuits to selectively actuate said pilot motor forwardly and rearwardly in response respectively to underspeed and overspeed conditions in said governor.

2. In an apparatus for testing propeller governors having ports for the entrance and discharge of fluid, the combination of: a governor mounting pad providing passage means positioned to register with the ports of said governor and including means for detachably connecting the governor to said pad with the governor ports registered with said passage means; a drive connection adjacent said pad for detachable connection to said governor to drive same when mounted on said mounting means; a driving motor for driving said governor through said connection; means including a control member movable forwardly and rearwardly for changing the speed of said drive connection and thereby changing the driven speed of said governor; a reversible electric pilot motor operatively connected to said control member and providing a pair of energizing circuits respectively energizable to drive said pilot motor in opposite directions; a first contact means comprising a pair of spaced contacts respectively connected to said circuits; a second contact means comprising an intermediate contact movable to selectively engage the contacts of said pair to selectively close said circuits; a governor-controlled hydraulic member movable in response to a change in governor operating conditions; means for operatively connecting one of said contact means to said governor-controlled hydraulic member to move therewith and relative to the other of said contact means to selectively close said circuits to energize said pilot motor in a manner to bring said governor to an onspeed condition; and means for operatively connecting the other of said contact means to said control member to move therewith and to move with said one of said contact means when engaged therewith, said governor-controlling hydraulic member separating said two contact means when the governor is in an onspeed condition.

3. A combination as defined in claim 2, including a friction clutch operatively disposed in one of said operative connections.

4. In an apparatus for testing propeller governors, the combination of: a governor mounting pad and including means for detachably connecting the governor to be tested to said pad; a variable-speed drive means for driving said governor when connected to said mounting means, said drive means including a circuit for changing the driving speed of the governor; two contacts connected in said circuit to close same and change said driving speed upon engagement of said contacts; means for moving one contact in response to an offspeed condition of said governor to engage and advance the other contact; means for mounting each of said contacts for individual bodily movement, said mounting means for said other contact including friction means permitting movement of said other contact to a new position upon advancing engagement thereof by said one contact and means for separating said contacts to open said circuit when said governor reaches an onspeed condition.

5. In an apparatus for testing propeller governors, the combination of: a governor mounting means; a variable-speed drive means for driving said governor when connected to said mounting means, said drive means including a movable control member for changing the speed of said governor and electric means for moving said control member, said electric means including a control circuit; two movably-mounted contacts in said circuit to energize same when in engagement; means for moving one of said contacts in response to an offspeed condition of said governor to engage and advance the other of said contacts; and means for driving said other contact from said control member to move in the direction of the aforesaid advancement of said one contact but at a rate insufficient to separate it from said one contact until said one contact stops.

6. In an apparatus for testing propeller governors, the combination of: a drive means for the governor; a forwardly and rearwardly movable control means for varying the speed of said drive means; a first contact means providing two spaced side contacts; a second contact means providing an intermediate contact disposed between said side contacts; means for movably mounting both contact means to move independently and in a manner to retain said intermediate contact in the space between said side contacts; means for operatively connecting said contact means to said control means to move said control means forwardly when said intermediate contact engages one side contact and to move said control means rearwardly when said intermediate contact engages the other side contact; a first actuating means for moving one contact means in opposite directions in response respectively to underspeed and overspeed conditions of said governor and for stopping the movement of this one contact means when said governor is in an onspeed condition, said movement of said one contact means being sufficient to engage and drive the other contact means; and a second actuating means for operatively connecting the other contact means to said control means to move same forwardly and rearwardly in response to forward and rearward movement of said control means but at a rate insufficient to disengage said one contact means until this one contact means stops.

7. A combination as defined in claim 6, in which one of said actuating means includes a slippage clutch.

8. In an apparatus for testing propeller governors, the combination of: a drive means for the governor; a forwardly and rearwardly movable control means for varying the speed of said drive means; two sets of control elements each set including two movably mounted control elements providing engageable contact means; means for selectively connecting the contact means of each set to said control means to move same and vary the speed of said drive means; a first actuating means for moving one control element of each set in the same direction; a second actuating means for moving the two remaining control elements of the two sets in opposite directions; means for operatively connecting one of said actuating means to the governor to be tested to move this actuating means and its associated control elements in response to an offspeed condition of the governor; and means for connecting the other of said actuating means to said control means to move this other actuating means and its associated control elements in response to movement of said control means to actuate said contact means in a manner to prevent further movement of said control means when the governor reaches an onspeed condition.

9. In an apparatus for testing propeller governors, the combination of: a governor mounting means; a drive means for driving a governor when mounted on said mounting means; a reversible pilot motor including two control circuits adapted when respectively energized to drive said pilot motor in opposite directions; means for connecting said pilot motor to said drive means to increase the speed of said drive means when said pilot motor turns in one direction and to decrease the speed of said drive means when said pilot motor turns in the other direction; an automatic control unit comprising a set of control drums mounted to move about a common axis, said control drums including a first control drum providing spaced contacts and a second control drum providing an intermediate contact positioned between said spaced contacts; means for frictionally driving one control drum from said pilot motor; a hydraulic actuator comprising a cylinder and a piston; means for turning the other of said control drums in response to movement of said piston; means for connecting said contacts in said control circuits of said pilot motor; and means for hydraulically connecting said hydraulic actuator to said governor to move said piston in opposite directions in response to underspeed and overspeed conditions of said governor and to maintain said piston stationary when said governor assumes an onspeed condition.

10. A combination as defined in claim 9, in which said automatic control unit includes another set of control drums mounted to move about a common axis, and comprising a first control drum providing spaced contacts and a second control drum providing an intermediate contact positioned between said spaced contacts, said combination including means for selectively connecting the contacts of said two sets of control drums to said control circuits, means for frictionally turning one drum of each set in opposite directions when said pilot motor turns in a given direction, and means for connecting the remaining drums of each set to said hydraulic actuator to turn simultaneously in the same direction upon movement of said piston in a given direction.

11. In combination in an apparatus for testing various types of propeller governors, including electric governors having a speed-responsive switch means such as a single-pole, double-throw switch, and other governors not employing such speed-responsive switch means: a governor mounting means; a drive means for driving said various types of governors when mounted on said governor mounting means; an electric speed-control means for said drive means including two energizing circuits adapted when respectively energized to decrease and increase the speed of said drive means; an automatic control unit providing control switch means adapted for connection to said energizing circuits; means for operatively connecting said automatic control unit to the governor being tested to actuate said control switch means in a manner to change the speed of said drive means and bring the governor being tested into an onspeed condition when said control switch means is connected to said energizing circuits; and electric means for selectively connecting said speed-responsive control switch means and said switch means of said automatic control unit to said energizing circuits to control the electric speed-control means in response to actuation of either switch means.

12. In an apparatus for testing hydraulic governors for adjusting the pitch of a propeller subject to transfer ring leakage, said governor having ports for the entrance and discharge of fluid, the combination of: a governor mounting pad providing passage means positioned to register with the ports of said governor; means for detachably connecting the governor to said pad with its ports registered with said passage means; means for driving said governor when mounted on said pad; an oil reservoir; a pump for withdrawing oil from said reservoir; a first conduit means for conducting the pressured oil from said pump to one of said passage means of said pad for delivery to said governor, said oil returning from said governor through another of said passage means of said pad; a second conduit means communicating with said other passage means and including a restriction through which a major portion of the oil is returned to said oil reservoir; and means comprising a small orifice for bleeding from said second conduit means at a position ahead of said restriction an amount of oil substantially corresponding to said transfer ring leakage.

13. An apparatus as defined in claim 12 including a pressure gauge communicating with said second conduit means ahead of said restriction to indicate the pressure therein as reduced by said bleeding of oil through said orifice, and including means for conducting to said oil reservoir the oil bled from said second conduit means through said orifice.

RICHARD D. MAYSTEAD.

REFERENCES CITED

The following references are of record in the file of this patent:

UNITED STATES PATENTS

| Number | Name | Date |
| --- | --- | --- |
| 272,362 | Weston | Feb. 13, 1883 |
| 353,990 | Sperry | Dec. 7, 1886 |
| 1,863,522 | Fairbairn | June 14, 1932 |
| 2,228,068 | White | Jan. 7, 1941 |
| 2,234,309 | Kromholz | Mar. 11, 1941 |
| 2,310,974 | Lumm | Feb. 16, 1943 |
| 2,364,709 | Greer | Dec. 12, 1944 |
| 2,410,155 | Falk | Oct. 29, 1946 |

FOREIGN PATENTS

| Number | Country | Date |
| --- | --- | --- |
| 314,965 | Great Britain | Sept. 25, 1930 |

Certificate of Correction

Patent No. 2,468,635.

April 26, 1949.

RICHARD D. MAYSTEAD

It is hereby certified that errors appear in the printed specification of the above numbered patent requiring correction as follows:

Column 3, lines 10 and 11, for the word "arrangement" read *arrangements*; column 19, lines 41 and 42, strike out "and the momentum of the pilot motor 82, as described,"; column 30, line 5, claim 11, strike out "control" and insert the same after "said", same line;

and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*